(12) United States Patent
Fust

(10) Patent No.: US 12,087,519 B2
(45) Date of Patent: Sep. 10, 2024

(54) OPERATING UNIT FOR A VEHICLE

(71) Applicant: BEHR-HELLA THERMOCONTROL GMBH, Lippstadt (DE)

(72) Inventor: Winfried Fust, Lippstadt (DE)

(73) Assignee: BEHR-HELLA THERMOCONTROL GMBH, Lippstadt (DE)

( * ) Notice: Subject to any disclaimer, the term of this patent is extended or adjusted under 35 U.S.C. 154(b) by 90 days.

(21) Appl. No.: 17/928,555

(22) PCT Filed: Apr. 19, 2021

(86) PCT No.: PCT/EP2021/060117
§ 371 (c)(1),
(2) Date: Nov. 29, 2022

(87) PCT Pub. No.: WO2021/254676
PCT Pub. Date: Dec. 23, 2021

(65) Prior Publication Data
US 2023/0282429 A1   Sep. 7, 2023

(30) Foreign Application Priority Data
Jun. 16, 2020  (DE) ..................... 10 2020 115 847.5

(51) Int. Cl.
*H01H 21/22* (2006.01)
*B60K 35/10* (2024.01)

(52) U.S. Cl.
CPC ............ *H01H 21/22* (2013.01); *B60K 35/10* (2024.01); *B60K 2360/126* (2024.01); *B60K 2360/128* (2024.01); *B60K 2360/143* (2024.01)

(58) Field of Classification Search
CPC .......... H01H 2003/00; H01H 2003/02; H01H 2003/028; H01H 2003/12;
(Continued)

(56) References Cited

U.S. PATENT DOCUMENTS

| 4,582,969 A |   | 4/1986 | Ishiguro |
| 5,268,545 A | * | 12/1993 | Bruner ................ H01H 13/705 |
|  |  |  | 200/344 |

(Continued)

FOREIGN PATENT DOCUMENTS

| DE | 36 43 927 A1 | 7/1988 |
| DE | 44 01 644 A1 | 2/1997 |
| DE | 197 57 928 A1 | 7/1999 |
| DE | 10 2005 049 848 A1 | 4/2007 |
| DE | 10 2008 019 124 A1 | 10/2009 |
| DE | 10 2011 085 725 A1 | 6/2012 |
| DE | 10 2017 220 789 A1 | 1/2019 |
| DE | 10 2017 220 780 B3 | 2/2019 |
| DE | 10 2017 222 601 A1 | 6/2019 |
| DE | 10 2018 121 678 A1 | 3/2020 |

(Continued)

*Primary Examiner* — Anthony R Jimenez
(74) *Attorney, Agent, or Firm* — BakerHostetler

(57) ABSTRACT

The operating unit for a vehicle includes an operating element having an operating surface movable in an actuating direction from a rest position into a function-triggering position and from the function-triggering position back to the rest position by means of depressing. A parallel guiding device ensures that the operating surface moves in parallel. The parallel guiding device is provided with at least one pair of engaging first and second levers which are mounted in an articulated manner with play on support elements being in turn connected to the operating element. The support elements are axially guided on a carrier element. The levers are pivotably mounted on bearing blocks, substantially free of play, so that the operating element behaves substantially free of play in directions transverse to the depressing movement. The parallel guiding device is designed in compliance with tolerances that are comparatively easy to realize in terms of manufacture.

19 Claims, 3 Drawing Sheets

(58) Field of Classification Search
CPC ......... H01H 2003/121; H01H 2003/32; H01H 2003/46; H01H 2003/466; H01H 2009/20; H01H 2013/00; H01H 2013/02; H01H 2013/50; H01H 2013/56; H01H 2013/04; H01H 2215/00; H01H 3/00; H01H 3/02; H01H 3/04; H01H 3/12; H01H 3/122; H01H 3/32; H01H 9/0271; H01H 9/20; H01H 9/22; H01H 9/24; H01H 13/00; H01H 13/12; H01H 13/14; H01H 13/18; H01H 13/20; H01H 13/285; H01H 13/50; H01H 13/705; H01H 21/22; G06F 3/016; G06F 3/03547; G06F 3/0414; B60K 2360/143; B60K 35/10; B60K 2360/128; B60K 2360/126

See application file for complete search history.

(56) References Cited

U.S. PATENT DOCUMENTS

| | | |
|---|---|---|
| 5,657,860 A | 8/1997 | Koike et al. |
| 5,813,521 A | 9/1998 | Koike et al. |
| 2010/0172080 A1 | 7/2010 | Bestle |

FOREIGN PATENT DOCUMENTS

| | | | |
|---|---|---|---|
| DE | 10 2019 203 031 A1 | 9/2020 | |
| EP | 0 304 847 A1 | 3/1989 | |
| EP | 0419145 A1 * | 9/1990 | ............. G06K 11/12 |
| EP | 1 458 000 A1 | 9/2004 | |
| EP | 449 448 A1 | 5/2012 | |
| WO | 2011/000910 A1 | 1/2011 | |
| WO | 2014/198418 A1 | 12/2014 | |
| WO | 2016/183498 A1 | 11/2016 | |

* cited by examiner

OPERATING UNIT FOR A VEHICLE

CROSS-REFERENCE TO RELATED APPLICATIONS

This application is a National Stage of International patent application PCT/EP2021/060117, filed on Apr. 19, 2021, which claims priority to foreign German patent application No. DE 10 2020 115 847.5, filed on Jun. 16, 2020, the disclosures of which are incorporated herein by reference in their entirety.

TECHNICAL FIELD

The invention relates to an operating unit for a vehicle and in particular an operating unit for a vehicle having an improved parallel guidance for a large operating element.

BACKGROUND

Modern operating concepts for vehicles comprise an operating unit with comparatively large touch displays. Since touching the display surface (operating surface) alone does not necessarily signal to the user whether the desired operating function has been accepted by the system, efforts are made to provide the operator with visual, acoustic or tactile feedback to acknowledge acceptance of the input command. In particular feedback concepts known as "haptic feedback" have proven to be advantageous because of their convenience. There is a distinction between passive and active haptic feedback. An active haptic feedback requires active pulse-like mechanical excitation of the operating element (display), which can be constructively complex in terms of both actuator technology and damping of undesired vibrations. In this respect, the so-called passive haptic feedback is advantageous, in which a mechanical switch or generally a kinematics impulsively acts mechanically on the operating element when the operating element (e.g. display) is pressed down, which is tactilely more familiar to the user.

Operating elements with large operating surfaces tend to tilt, especially during eccentric manual actuation, instead of performing a translational depressing movement. However, so that ideally only a single mechanical switch or similar kinematics can be used for passive haptic feedback, a parallel stroke movement of the operating element should be provided, in which the depressing movement of the operating element takes place while maintaining the parallelism of the operating surface. Approaches for this can be found, for example, in DE-C-34 33 719, DE-A-36 43 927, DE-C-44 01 644, DE-C-196 01 492, DE-A-197 57 928, DE-A-10 2008 019 124, DE-A-10 2011 085 725, DE-B-10 2017 220 780, DE-A-10 2017 222 601, DE-A-10 2018 121 678, DE-A-10 2019 203 031, EP-A-0 304 847, EP-B-1 458 000, EP-B-2 449 448, U.S. Pat. No. 5,813,521, US-A-2010/0172080, WO-A-2011/000910, WO-A-2014/198418 and WO-A-2016/183498.

SUMMARY OF THE DISCLOSURE

It is an object of the present invention to provide a structurally simple parallel guiding device for operating elements of operating units for vehicles, which is oriented to the minimum of tight tolerances to be observed.

The object of the invention is achieved with the invention proposing an operating unit for a vehicle (i.e. for the installation in a vehicle) provided with
 an operating element having an operating surface, which operating element is guided movably in an actuating direction from a rest position into a function-triggering position and back by means of depressing, and
 a parallel guiding device for parallel guidance of the operating element during its movement in the actuating direction and in the opposite direction, the parallel guiding device being provided with
 a carrier element having an upper side facing the operating element and a lower side facing away from the operating element,
 a lever assembly having at least a first lever and at least a second lever,
 a bearing assembly having at least a first bearing block, on which the first lever is pivotably mounted about a pivot axis extending transversely to the actuating direction, and having at least one second bearing block, on which the second lever is pivotably mounted about a pivot axis extending transversely to the actuating direction, the pivot axes of both levers being parallel to each other,
 two opposing support elements for the operating element, which protrude from the operating element in the actuating direction and extend through passage openings in the carrier element and/or laterally past the carrier element up to beyond its lower side,
 the lever assembly and the bearing assembly being located below the carrier element as well as between the two support elements,
 each lever having a first lever arm extending from its pivot axis and a second lever arm extending from its pivot axis opposite to the first lever arm,
 the first lever arm of the at least one first lever being received in an articulated manner by an articulated recess, provided with a recess opening, of the one support element,
 the first lever arm of the at least one second lever being received in an articulated manner by an articulated recess, provided with a recess opening, of the other support element,
 the second lever arm of the at least one first lever and the at least one second lever being in pivoting engagement with each other.

The concept of the operating unit according to the invention comprises, for the parallel guidance of the operating element in actuating direction, i.e. from the rest position up to the function-triggering position, and opposite to the actuating direction, a parallel guiding device having a lever assembly below a stationary carrier element. The lever assembly is basically known in the prior art in terms of its design, for example from DE-C-44 016 44 and from DE-B-10 2017 220 789 or also from the WO publications mentioned above.

The assembly of the levers below the carrier element has the advantage to provide space above the carrier element for various operating concepts such as keys (mechanically, capacitively, optically, inductively operating), rockers, rotary adjusters, rotary/push adjusters, displays, touch displays, touch pads with "fixed" symbolism.

In an advantageous further embodiment of the invention, the articulated recesses of both support elements each have a geometry which, when the at least one first lever and the at least one second lever are pivoted within the articulated recess by moving the actuating element, permits a sliding movement of the respective first lever arm in the direction of the recess opening and in the opposite direction thereto and prevents a movement of the respective first lever arm within the articulated recess in the actuating direction of the actuating element and in the opposite direction thereto (so-called "sliding fit").

According to this further embodiment of the invention, however, the design of said lever assembly is particularly simple and provided with length adjustment compensations realized in a simple manner. The articulated joint of the first and second levers is created by means of articulations provided with play, within which one end of the first lever and the second lever, received in the stationary articulated parts of the articulations, can be displaced transversely to the actuating direction. The same applies for the articulated joint between the two levers. Providing the play enables a particularly simple lever assembly design that is easy to implement in terms of manufacture without having to meet excessively high tolerance requirements.

The operating element, which preferably is a display and in particular a touchscreen, is located above the stationary carrier element, which is arranged in the housing of the operating unit, for example. The operating element is provided with opposite support elements facing the carrier element, the support elements protruding beyond the carrier element and extending either through passage opening in the carrier element or through edge recesses of the carrier element. Two bearing blocks are located on the lower side of the carrier element, each of which pivotably mounts one of the two levers. Said pivot articulations are substantially free of play. The two levers extend within a plane arranged below the carrier element and extending substantially parallel to the carrier element (provided that the levers are not pivoted). The two levers engage each other with play at their facing ends and are received in articulated recesses, which are formed in each of the support elements, at their opposite ends. Each lever includes two lever arms, one lever arm on both sides of the respective pivot articulation of the respective bearing block. The respective first lever arms are received by the articulated recesses on the support elements, while the respective second lever arms of the two levers engage with each other. This can be done, for example, by means of a toothing (preferably involute toothing) or also by means of an articulated formation similar to that by means of which the first lever arms of the two levers are received in the respective support elements.

The first lever arms of the two levers shift slightly in the articulated recesses of the respective support parts when the operating element is depressed or returns from the function-triggering position to the rest position. In this respect, the articulated recesses of the support elements thus allow a sliding movement of the respective first lever arm in the direction of the recess opening of the respective support element to which the articulated recess is adjoining and in the opposite direction (sliding fit).

In the operating unit according to the invention, the function can be triggered either by a contact sensor system in a touchscreen that forms the operating element, or by a switch that is actuated in the function-triggering position of the operating element. A combination of both mechanisms is also possible.

In an advantageous embodiment of the invention, it may be provided that each first lever arm has an articulated end received by one of the articulated recesses, and that each articulated recess has a receiving space adjoining the recess opening, which encompasses the articulated end of the respective first lever arm for preventing movements of the articulated end of the first lever arm within the receiving space in the actuating direction of the operating element and in the opposite direction thereto and guides the articulated end of the respective first lever arm for permitting sliding movements of the articulated end of the first lever arm within the receiving space in the manner of a link.

Here, it can be advantageously provided that each articulated recess is essentially U-shaped. Viewed from the side of the two levers of the lever assembly, each articulated recess on the support elements is formed in the manner of a horizontal "U", the opening of the "U" being the recess opening and the articulated recess adjoining this recess opening. The depth of the articulated recess is selected such that the articulated end of the respective first lever arm of one of the two levers received by the articulated recess still has play to the bottom of the articulated recess when the lever is oriented substantially parallel to the carrier member, and that the articulated end of the respective first lever arm is still received by the articulated recess when the lever arm is in the maximum pivot position.

Expediently, each lever with its respective first lever arm is received in an articulated manner on the respective support element or on respectively two or three support parts (support bars) of the support element, respectively, via two or three protrusions forming the respective articulated end. This ensures torsional stiffness of the overall assembly, in which the parallel guidance of the operating surface of the operating element is ensured when the latter is depressed, even if, for example, the operating element is depressed in a corner region or in an edge region, and reduces the susceptibility of the parallel guidance or lever assembly and its articulated joint to the support elements to material distortion, which can be problematic particularly in the case of plastic injection moldings and in particular in the case of those that have a large-size design.

In a further advantageous embodiment of the invention, the operating element should have a substantially square or rectangular contour with two longitudinal edges and two transverse edges. A further advantage is that the support elements protrude from the operating element along the two transverse edges or along the two longitudinal edges of the operating element in the actuating direction.

In a further structurally expedient embodiment of the invention, each support element has two spaced-apart support bars which, in the corner regions of the operating element formed respectively by a longitudinal edge and a transverse edge, protrude from the operating element in the actuating direction, wherein each support bar has an articulated recess.

In this previously described embodiment of the invention, it is expedient if each articulated end of the first lever arms of the at least one first lever and of the at least one second lever has two articulated end protrusions which are plunged into the articulated recesses of the support bars of the respective support elements (sliding fit).

As described above in connection with preventing/reducing susceptibility to material distortion with respect to the articulated joint of the first lever arms to the support members, advantageously, the second lever arms of the at least one first lever and of the at least one second lever may be connected to each other in an articulated manner. Within said sections, the second lever arm of the one lever has an articulated protrusion plunging into an articulated recess of the second lever arm of the other lever with a "sliding fit".

As already indicated above, it is further advantageous if the second lever arms of the at least one first lever and the at least one second lever each have an articulated end, one of these two articulated ends having an articulated recess into which the other articulated end is plunged, preventing movement in the actuating direction as well as in the opposite direction within the articulated recess and allowing a sliding movement orthogonal to the actuating direction.

It may be expedient if the second lever arms of the at least one first lever and the at least one second lever each have an articulated end, wherein these two articulated ends are interlocked. In connection with the lever assembly, it has already been mentioned above that the lever assembly has at least one pair of levers comprising a first lever and a second lever, both of which are pivotably mounted on bearing blocks and have their ends facing each other coupled to each other in an articulated manner. These two levers can be designed to be torsionally stiff in the way of two plate-like constructions, which should be done in particular depending on the material. As a suitable material for the lever assembly (but also for the support elements and the bearing blocks), plastic is a much lighter and easier material to process than, for example, metal. For material saving, the plate-like levers should be constructively stiffened, which can be achieved by means of stiffening ribs or the like and should be familiar to the person skilled in the art when it comes to constructively stiffening components consisting of plastic.

As already indicated above, the operating surface of the operating element may include a display with a contact sensor system for detecting a contact of the display by an actuating object such as the finger of a hand, for example.

If necessary, at least one rocker key and/or at least one push key and/or at least one rotary knob and/or at least one rotary/push adjuster can be arranged on the operating element in addition to the display.

To further improve the transverse guidance, it is advantageous if the operating element is guided in a plane extending transversely to the actuating direction so as to be secured against undesired displacement, e.g. by means of a pin-and-hole-receiving guide, which can be done, e.g. at three points that are not on a common straight line, between the support element and the operating element, advantageously by means of axial pin-and-hole-receiving sliding guides.

The operating unit may also comprise a housing having a front side with a recess in which the operating element is arranged, the carrier element being mounted in and/or to the housing.

Operating units for vehicles in which the operating surface of the operating element has several symbol fields that trigger different operating functions when being contacted and then depressed are more expediently provided with haptic feedback. In recent years, such concepts have become more popular than the feedback of a valid function triggering by means of optical and acoustic signals. In haptic feedback, a distinction is made between active and passive systems. In active systems, the operating element is mechanically stimulated in a pulse-like manner by means of an actuator, which the operator feels tactilely. Such active haptic feedback system are comparatively complex in their construction. Simpler, however, are so-called passive haptic feedback systems, which use a switch that has an actuation force-displacement characteristic to the extent that the switch actuating member of the switch is initially moved gradually as the actuating force is increased, to a point where it automatically "snaps" into the function-triggering position without any further increase in actuating force, typically using a curved spring steel disc. Switches having such characteristics provide a haptic feedback and correspond to the familiar behavior known from conventional keys. If such a switch is now used with the operating unit according to the invention, a single such switch can be used to provide haptic feedback to the operating unit according to the invention.

According to an advantageous embodiment of the invention in this respect, the operating unit thus has a mechanical switch with a switch housing and a switch actuating member, wherein the switch housing is arranged on the upper side or on the lower side of the carrier element and its switch actuating member is adapted to be actuated by the operating element upon its movement from the rest position into the function-triggering position, or wherein the switch housing is arranged on the lower side of the carrier element and its switch actuating member is adapted to be actuated by one of the two second lever arms being in pivoting engagement with each other, or wherein the switch housing is arranged on one of the two second lever arms being in pivoting engagement with each other and its switch actuating member is adapted to be actuated upon movement of the operating element from the rest position into the function-triggering position by means of the carrier element, or wherein the switch is arranged below one of the support elements and its switch actuating member is adapted to be actuated upon movement of the operating element from the rest position into the function-triggering position either by the respective support element or by a counterface in extension of the respective support element.

The switch is arranged between the carrier element and the operating element and thus between a stationary element and a movable element. In terms of tolerances, this concept is preferable to one in which the switch is arranged between the levers and the operating element, and thus "pressed in" between the two from two sides.

In other words, the switch has a kinematic unit with a pulse excitation member that can be moved mechanically, directly or indirectly, when the operating element is moved from the rest position into the function triggering position, for generating mechanical energy as a result of a mechanical movement and for releasing this energy in a pulse-like manner under direct or indirect mechanical action on the operating element when the operating element reaches its function-triggering position.

The switch housing may also be realized as the dome (also called key top) of a switching mat, in which a snap disc made of e.g. spring steel is integrated. The function of the switch actuating member is then also performed by the dome with an inwardly protruding plunger, the front face of which is coated with electrically conductive material and, in a depressed state, short-circuits two contact fields on a circuit board.

As already described above, the operating element may comprise a display with or without backlighting and with a display surface displaying changeable information in the form of, for example, symbols, icons, alphanumeric characters or graphics as the operating surface, or the operating element may have a display surface displaying unchangeable information, in particular backlit unchangeable information in the form of, for example, symbols, icons, alphanumeric characters or graphics as the operating surface.

One essential feature of the invention is to make the contacting and sliding surfaces in the various articulated joints as small as possible with the lowest possible tolerances, so that any possible material distortion of the parts, which are typically made of plastic, is as small as possible or can be compensated for in a simple manner.

BRIEF DESCRIPTION OF THE DRAWINGS

In the following, an exemplary embodiment of the invention is described in detail by means of the drawing. In the Figures.

DETAILED DESCRIPTION OF THE DISCLOSURE

Figure 1:
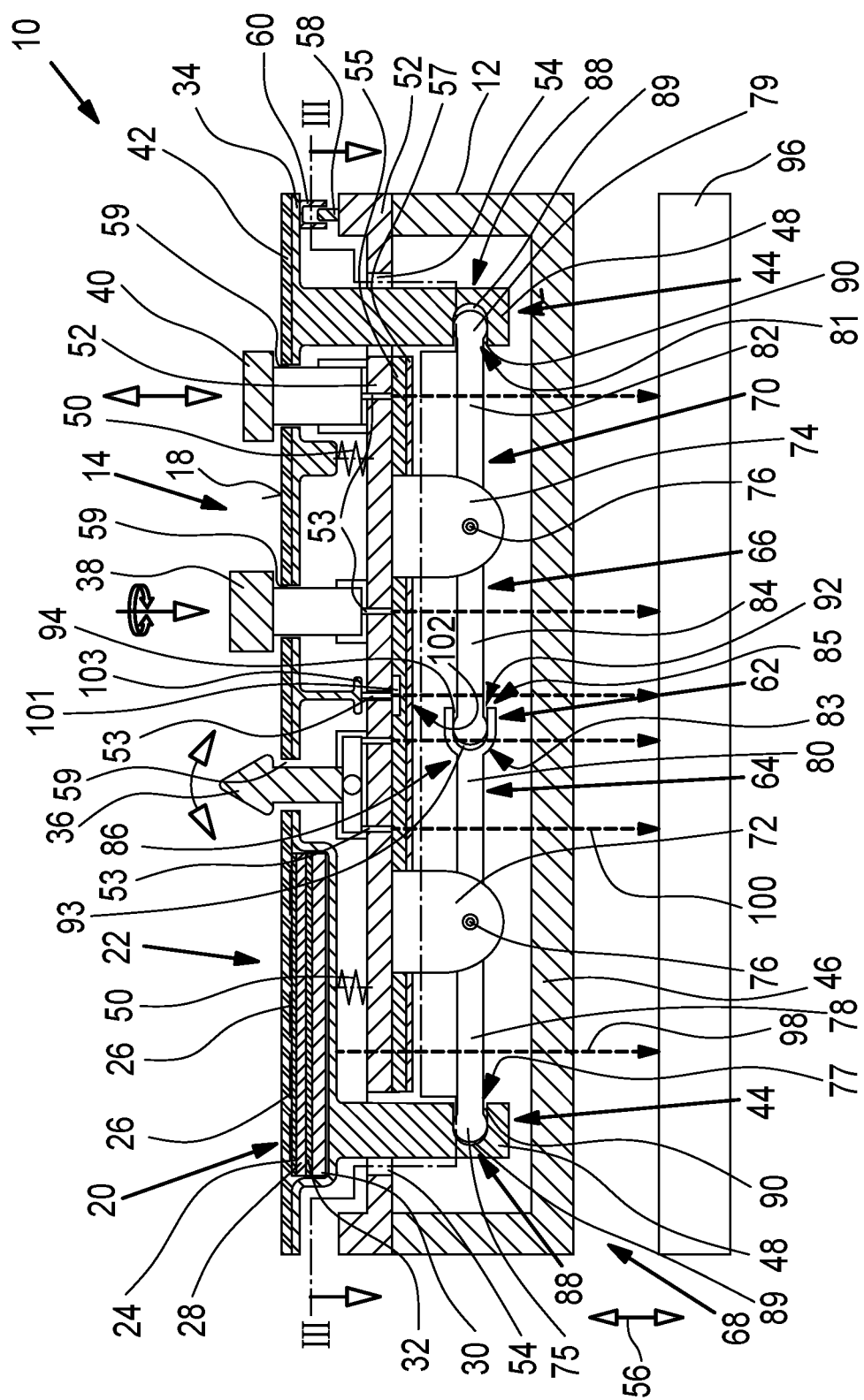
FIG. 1 shows a schematic sectional view through an operating unit, the operating element being in its rest position.

In FIG. 1, the structure of an exemplary embodiment of an operating unit 10 according to the invention is shown schematically in section and in perspective. The operating unit 10 comprises a housing 12 on the front side 14 of which the operating surface 18 of a depressible operating element 20 is located. The operating element 20 has a display 22 with a contact sensor system 24 in a portion of the operating surface 18. The operating surface 18 has individual operating panels 26. Below the contact sensor system 24 is the actual display unit 28 of the display 22, behind which is a backlight unit 30 with a diffuser 32, for example. The display 22 is located on an operating element carrier 34 on which further mechanical operating elements 20 can be located. These further mechanical operating elements 20 include, for example, a number of adjacently arranged rocker or toggle keys 36, a rotary/push adjuster 38, and one or more push keys 40. The operating surface 18 is formed by a so-called cover plate 42, which may be made of glass or plastic, for example. In the area of the further mechanical operating elements 20, the cover plate 42 has corresponding recesses. In addition, the operating element 20 may also include capacitively acting keys or, if applicable, a touch pad with "fixed" symbolism instead of the display.

The operating element 20 is provided with support elements 44, which are in the form of support bars 48 pointing towards the bottom 46 of the housing 12. Typically, there are four such support bars 48 on the lower side of the operating element carrier 34.

The operating element 20 may be resiliently mounted, as indicated at 50, to a carrier element 52 that extends through or spans the housing 12 and is substantially parallel to the bottom 46 of the housing 12. The carrier plate comprises passage openings 54 through which the support bars 48 extend up to below the carrier element 52. The operating element carrier 34 is axially guided on the carrier element 52 and secured against displacement in a plane orthogonal to the actuating direction of the operating element. For this purpose, three tongue-and-groove or pin-and-hole-receiving guides are provided, two of which are illustrated and each of which includes a guiding pin 58 on the operating element carrier 34 that is plunged into a guiding recess 60 in the carrier element 52. The surfaces sliding on each other are dimensioned as small as possible to make the axial guidances insensitive to material distortion. The carrier element 52 thus has the function of a stationary translational guiding element on which the movable counter guiding element, in this case the support bars 48, is guided axially and free of play.

The above-mentioned further operating elements (rocker or toggle keys 36, rotary/push adjusters 38, and push keys 40) are arranged on the upper side of the carrier element 52 and protrude through openings 59 in the cover plate 42 upward beyond the latter. The switching contacts actuated by these further operating elements are located on a circuit board 57, which is arranged on the lower side of the carrier element 52 with the interposition of a switching mat 55. The mechanical transmission of the actuation of the operating elements for effecting the closing of a switching contact is effected by plungers 53 which pass through the carrier element 52 and are mounted so as to be axially displaceable and rest on switching domes of the switching mat 55, but this is not shown in detail.

Below the carrier member 52 is a lever assembly 62 that includes two levers 64, 66. In this exemplary embodiment, said two levers 64, 66 are plate-shaped and torsionally stiff. Together with the carrier element 52, they form a parallel guiding device 68 that allows the operating surface 18 to move in parallel when pressure is manually applied to one of the operating panels 26. This parallel guiding device 68 further includes a bearing assembly 70 having a first bearing block 72 for pivotably mounting the first lever 64 and a second bearing block 74 for pivotably mounting the second lever 66. The two pivot axes are shown at 76.

Figure 3:
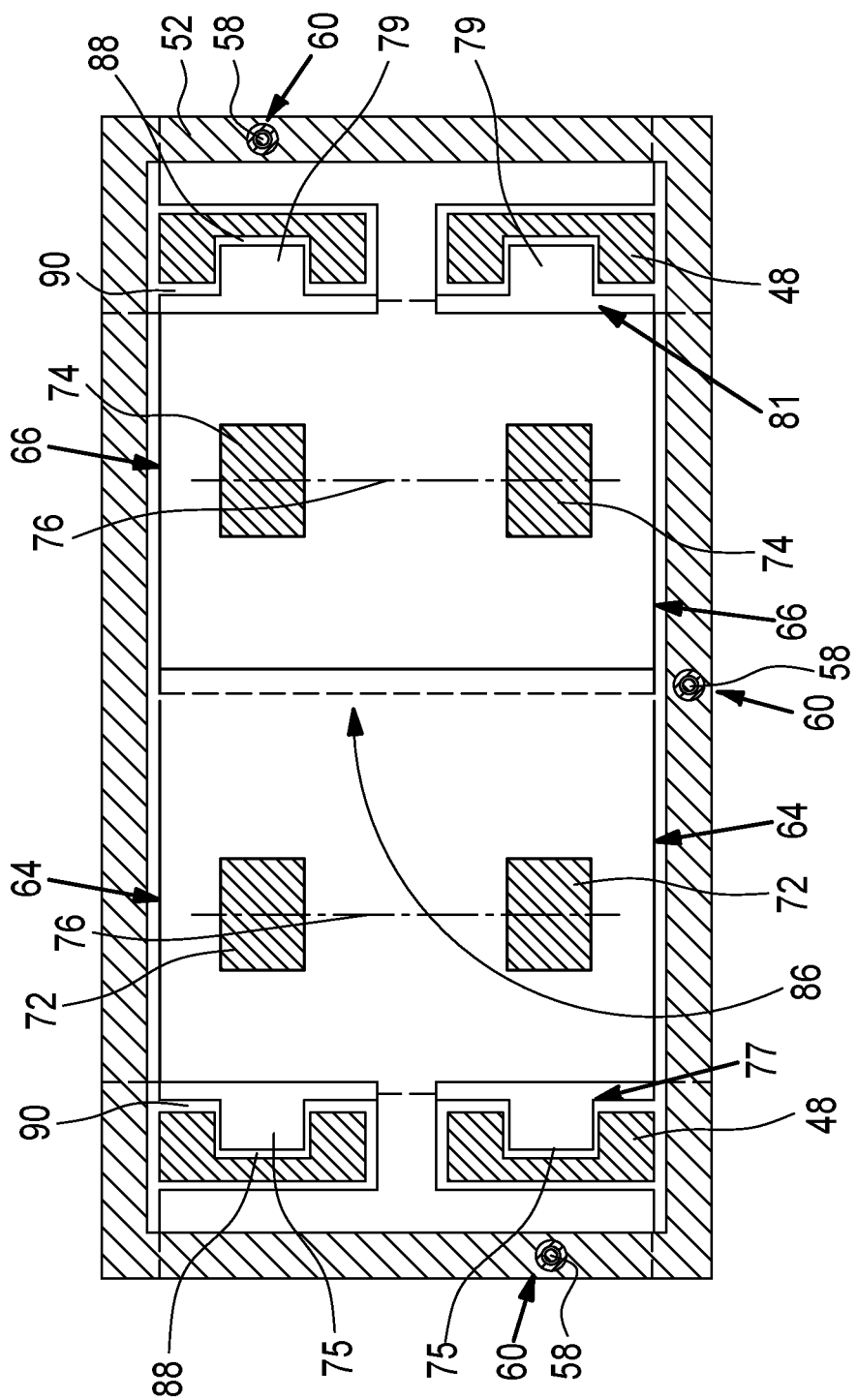
FIG. 3 shows a plan view of the operating unit in horizontal section along line III-III of FIG. 1.

The pivoting mounting of the two levers 64, 66 creates a first lever arm 78 and a second lever arm 80 on both sides of the first lever 64. With respect to the second lever 66, a first lever arm 82 and a second lever arm 84 are created. The second lever arms 80, 84 of the two levers 64, 66 are coupled to each other by means of an articulated joint 86, while, an articulated end 77 of the first lever arm 78 of the first lever 64 is coupled to the two support bars 48 in an articulated manner and an articulated end 81 of the first lever arm 82 of the second lever 66 is coupled to the other two support bars 48 in an articulated manner. The articulated ends 77 and 81 are formed as protrusions 75 and 79, respectively, as can be seen in FIG. 3, for example.

Figure 2:
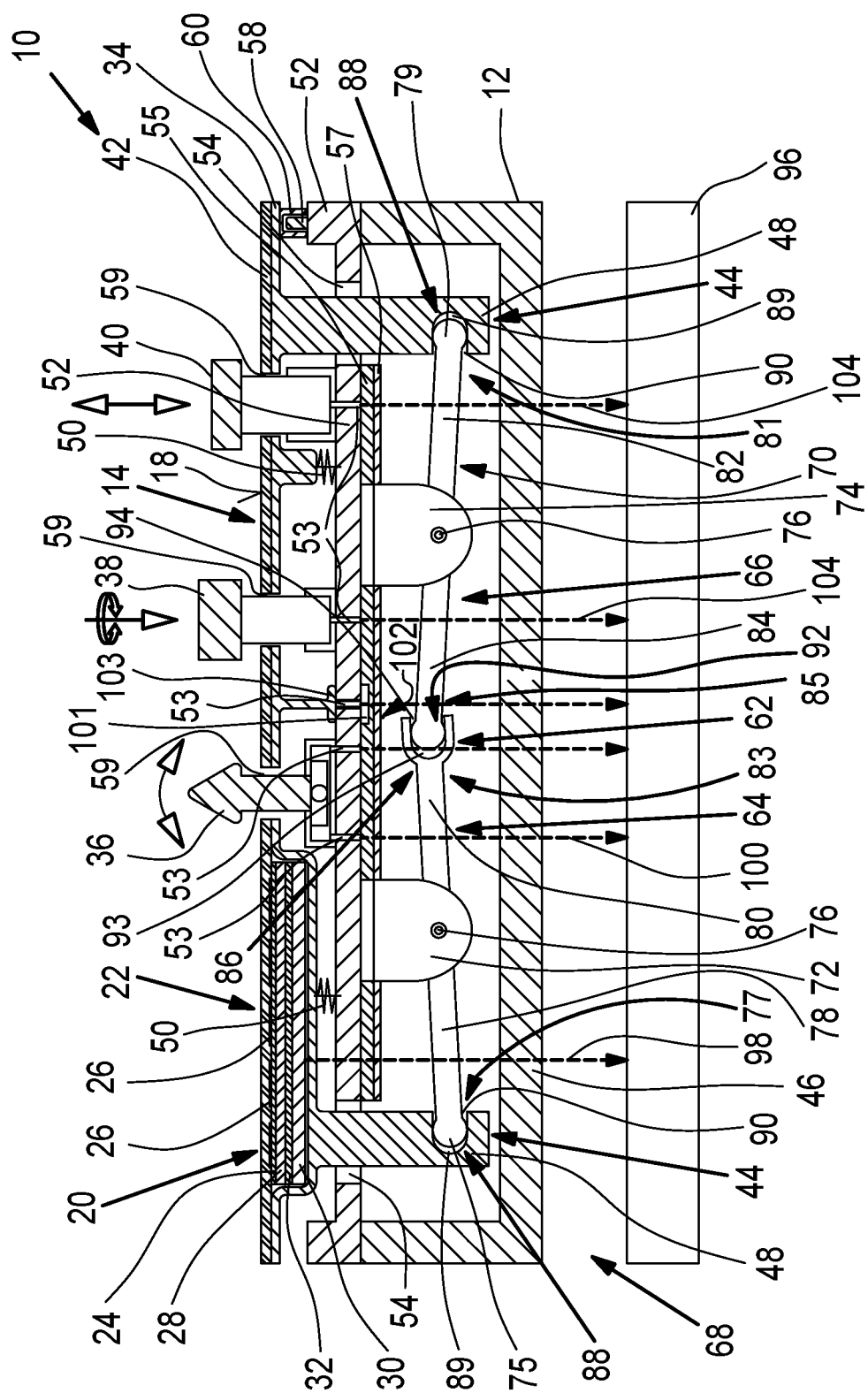
FIG. 2 shows a schematic sectional view of the operating unit with an operating element in a depressed state and thus in the function-triggering position.

As can be seen from FIG. 2, the articulated joints of the levers to each other and to the support bars 48 are provided by means of articulations having play in one dimension. Thus, each support bar 48 has an articulated recess 88 with a receiving space 89 accessible through a recess opening 90 of the respective support bar 48. Likewise, the articulated joint 86 has an articulated recess 92 at the articulated end 85 of the second lever arm 80 of the one lever (in this exemplary embodiment, the first lever 64), which also has a receiving space 93 and is provided with a recess opening 94 through which an articulated end 83 of the second lever arm 84 of the other lever (in this example, the lever 66) is plunged. The assembly of these articulations is now such that it permits a sliding movement of the respective articulated ends 77, 81, 83 of the respective levers or lever arms, namely in a direction which is orthogonal to the actuating direction 56, namely towards and away from the respective recess opening 94.

The background to this approach and design becomes apparent when considering FIG. 2, which schematically shows how the parallel guiding device 68 behaves when pressure is applied to the operating surface 18 of the operating element 20. Then, the first and second levers 64, 66 pivot, whereby their articulated ends 77, 81, each mounted to the support bars 48 in an articulated manner, move within the respective articulated recesses 88 toward the respective recess opening (sliding fit). The same happens with the articulated joint 86.

The operating unit 10 according to the invention further comprises an evaluation and control unit 96 receiving signals 98 from the contact sensor system 24 of the display 22, signals 100 from a mechanical switch 102 as well as signals 104 from the various other operating elements 20. The evaluation and control unit 96 now controls or triggers various operating functions as a function of the signals received, as is known per se in multifunctional operating units for vehicles. The mechanical switch 102, which includes, for example, a switch housing 101 and a switch actuating member 103, is used to notify the evaluation and control unit 96 that valid manual actuation of one of the operating panels 26 has been detected. The mechanical switch 102 further serves to provide haptic feedback to the user, which in this exemplary embodiment is passive. The mechanism of the switch 102 can be tactilely felt when the finger of a hand is placed on one of the operating panels 26 and the operating element 20 is depressed.

As described above, the switch 102 may be an integral part of a switching mat, i.e. provided with a switching dome which actuates a spring washer when the switch is depressed or wherein, when the switch is actuated, a spring washer is pressed which abruptly "jumps over" and does not return from this state to its untensioned state until the force with which pressure is exerted against the operating element when the switch is depressed is removed, i.e. the operating element has been "released" to that extent. In this way, the switch also acts to move the operating element back from the depressed position to its rest position.

This can be supported by weights that are part of the levers 64 of the lever assembly 62, 66 as an alternative to the springs shown at 50. Based on FIG. 2, it can be seen that the two levers 64, 66 move upward between their respective pivot axes 76 when the operating element is moved downward. If a weight were now to be attached to or integrated into at least one of these levers (for example, the second lever arm 84 of the second lever 66), this weight would pull the second lever arm 84 of the second lever 66 downward when the depressing force on the operating element has been removed, i.e., the operating element has been released, so to speak. With this alternative, the resilient mounting, as indicated at 50, is therefore not absolutely necessary.

The only tolerances that are comparatively tight in terms of manufacture and that must be observed in the design of the parallel guiding device 68 are the tongue-and-groove guidances of the support bars 48 on the carrier element 52 or on the edges of the passage openings 54 of the carrier element 52 and the articulated joints of the two levers 64, 66 to each other and to the support bars 48, and only in the dimension in the actuating direction 56. With respect to this dimension, the articulately jointed ends of the levers 64, 66 should be free of play or have minimal play.

LIST OF REFERENCE NUMERALS

10 operating unit
12 housing
14 front side
18 operating surface of the operating element
20 operating element
22 display
24 contact sensor system of operating element
26 operating panels on operating surface
28 display unit of display
30 backlight unit of display
32 diffuser of display
34 operating element carrier
36 toggle keys of operating element
38 rotary/push adjuster of operating element
40 push keys of operating element
42 cover plate of operating element
44 support elements on operating element
46 bottom of housing
48 support bars of support elements
50 elastic bearing of operating element
52 carrier element
53 plunger
54 passage opening in support element
55 switching mat
56 actuating direction of operating element
57 circuit board
58 guiding pin
59 opening in cover plate
60 guiding recess
62 lever assembly of parallel guiding device
64 first lever of lever arm device
66 second lever of lever arm device
68 parallel guiding device
70 bearing assembly for levers
72 first bearing block
74 second bearing block
75 articulated end protrusion
76 pivot axes of the two levers
77 articulated end of the first lever arm of the first lever
78 first lever arm of the first lever
79 articulated end protrusion
80 second lever arm of the first lever
81 articulated end of the first lever arm of the second lever
82 first lever arm of the second lever
83 articulated end of the second lever arm of the first lever
84 second lever arm of the second lever
85 articulated end of the second lever arm of the second lever
86 articulated joint
88 articulated recess on a support bar
89 receiving space of the articulated recess
90 recess opening of the articulated recess
92 articulated recess
93 receiving space of the articulated recess
94 recess opening of the articulated recess
96 control unit
98 signals
100 signals
101 switch housing of switch
102 switch
103 switch actuating member
104 signals

BIBLIOGRAPHY

DE-C-34 33 719
DE-A-36 43 927
DE-C-44 01 644
DE-C-196 01 492
DE-A-197 57 928
DE-A-10 2008 019 124
DE-A-10 2011 085 725
DE-B-10 2017 220 780
DE-A-10 2017 222 601
DE-A-10 2018 121 678
DE-A-10 2019 203 031

EP-A-0 304 847
EP-B-1 458 000
EP-B-2 449 448
U.S. Pat. No. 5,813,521
US-A-2010/0172080
WO-A-2011/000910
WO-A-2014/198418
WO-A-2016/183498

The invention claimed is:

1. An operating unit for a vehicle, comprising
an operating element having an operating surface, which operating element is guided movably in an actuating direction from a rest position into a function-triggering position and back by means of depressing, and
a parallel guiding device for parallel guidance of the operating element during its movement in the actuating direction and in the opposite direction,
the parallel guiding device being provided with
a carrier element having an upper side facing the operating element and a lower side facing away from the operating element,
a lever assembly having at least one first lever and at least one second lever,
a bearing assembly having at least a first bearing block, on which the first lever is pivotably mounted about a pivot axis extending transversely to the actuating direction, and having at least one second bearing block, on which the second lever is pivotably mounted about a pivot axis extending transversely to the actuating direction,
the pivot axes of both levers being parallel to each other, and
two opposing support elements for the operating element, which protrude from the operating element in the actuating direction and extend through passage openings in the carrier element and/or laterally past the carrier element up to beyond its lower side,
the lever assembly and the bearing assembly being located below the carrier element as well as between the two support elements,
each lever having a first lever arm extending from its pivot axis and a second lever arm extending from its pivot axis opposite to the first lever arm,
the first lever arm of the at least one first lever being received in an articulated manner by an articulated recess, provided with a recess opening, of the one support element,
the first lever arm of the at least one second lever being received in an articulated manner by an articulated recess, provided with a recess opening, of the other support element, and
the second lever arm of the at least one first lever and the at least one second lever being in pivoting engagement with each other.

2. The operating unit according to claim 1, wherein the articulated recesses of both support elements each have a geometry which, when the at least one first lever and the at least one second lever are pivoted within the articulated recess by moving the actuating element, permits a sliding movement of the respective first lever arm in a direction of the recess opening and in the opposite direction thereto and prevents a movement of the respective first lever arm within the articulated recess in the actuating direction of the actuating element and in the opposite direction thereto.

3. The operating unit according to claim 1, wherein second lever arms of the at least one first lever and of the at least one second lever each have an articulated end, one of these two articulated ends having an articulated recess into which the other articulated end is plunged, preventing movement in the actuating direction as well as in the opposite direction within the articulated recess and allowing a sliding movement orthogonal to the actuating direction.

4. The operating unit according to claim 1, wherein second lever arms of the at least one first lever and of the at least one second lever each have an articulated end, wherein these two articulated ends are interlocked.

5. The operating unit according to claim 1 wherein the at least one first lever and the at least one second lever are each formed to be plate-like and torsionally stiff.

6. The operating unit according to claim 1, wherein the bearing assembly comprises several first bearing blocks and several second bearing blocks, wherein the first bearing blocks and the second bearing blocks are arranged distributed along a length of the pivot axis of the respective lever.

7. The operating unit according to claim 1, wherein the operating element is guided in a plane extending transversely to the actuating direction and is secured by a tongue-and-groove or pin-and-hole-receiving guide.

8. The operating unit according to claim 1, wherein the operating element is guided on the carrier element in a plane extending transversely to the actuating direction and is secured by a tongue-and-groove or pin-and-hole-receiving guide.

9. The operating unit according to claim 1, comprising a housing having a front side with a recess in which the operating element is arranged, the carrier element being mounted in and/or to the housing.

10. The operating unit according to claim 1, comprising a housing mounted to the carrier element.

11. The operating unit according to claim 1, comprising
a mechanical switch having a switch housing and a switch actuating member,
wherein the switch housing is arranged on the upper side or on the lower side of the carrier element and its switch actuating member is adapted to be actuated by the operating element upon its movement from the rest position into the function-triggering position, or
wherein the switch housing is arranged on the lower side of the carrier element and its switch actuating member is adapted to be actuated by one of the two second lever arms being in pivoting engagement with each other, or
wherein the switch housing is arranged on one of the two second lever arms being in pivoting engagement with each other and its switch actuating member is adapted to be actuated upon movement of the operating element from the rest position into the function-triggering position by means of the carrier element, or
wherein the switch is arranged below one of the support element and its switch actuating member is adapted to be actuated upon movement of the operating element from the rest position into the function-triggering position either by the respective support element or by a counterface in extension of the respective support element.

12. The operating unit according to claim 1, wherein each first lever arm has an articulated end received by one of the articulated recesses, and wherein each articulated recess has a receiving space adjoining the recess opening, which encompasses the articulated end of the respective first lever arm for preventing movements of the articulated end of the first lever arm within the receiving space in the actuating direction of the operating element and in the opposite direction thereto and guides the articulated end of the respective first lever arm for permitting sliding movements of the articulated end of the first lever arm within the receiving space as a link.

13. The operating unit according to claim 12, wherein each articulated recess is substantially U-shaped.

14. The operating unit according to claim 1, wherein the operating element has a substantially rectangular contour with two longitudinal edges and two transverse edges.

15. The operating unit according to claim 14, wherein the support elements protrude along the two transverse edges or along the two longitudinal edges of the operating element in the actuating direction.

16. The operating unit according to claim 1, wherein each support element comprises two support bars spaced apart from each other, wherein the four support bars protrude from the operating element facing in the actuating direction, and wherein each support bar comprises an articulated recess.

17. The operating unit according to claim 16, wherein each articulated end of the first lever arms of the at least one first lever and of the at least one second lever comprises two articulated end protrusions being plunged into the articulated recesses of the support bars of the respective support elements.

18. The operating unit according to claim 1, wherein operating surface of the operating element comprises a display with a contact sensor system and/or a touch pad with a contact sensor system and symbolism for detecting a contact of the display by an actuating object.

19. The operating unit according to claim 18, wherein at least one rocker key and/or at least one push key and/or at least one rotary knob and/or at least one rotary/push adjuster is or are arranged on the operating element in addition to the display.

* * * * *